April 23, 1940.    A. E. BACHELET    2,198,326
PROGRAM SWITCHING SYSTEM
Filed Sept. 22, 1938    12 Sheets-Sheet 1

INVENTOR
A.E.BACHELET
BY
ATTORNEY

FIG.3

April 23, 1940.    A. E. BACHELET    2,198,326
PROGRAM SWITCHING SYSTEM
Filed Sept. 22, 1938    12 Sheets-Sheet 4

FIG. 5

INVENTOR
A. E. BACHELET
BY
ATTORNEY

April 23, 1940.  A. E. BACHELET  2,198,326
PROGRAM SWITCHING SYSTEM
Filed Sept. 22, 1938    12 Sheets-Sheet 7

INVENTOR
A. E. BACHELET
BY
ATTORNEY

April 23, 1940.  A. E. BACHELET  2,198,326
PROGRAM SWITCHING SYSTEM
Filed Sept. 22, 1938  12 Sheets-Sheet 9

INVENTOR
A.E.BACHELET
BY
ATTORNEY

April 23, 1940.　　A. E. BACHELET　　2,198,326
PROGRAM SWITCHING SYSTEM
Filed Sept. 22, 1938　　12 Sheets-Sheet 11

FIG. 12

INVENTOR
A.E. BACHELET
BY
ATTORNEY

Patented Apr. 23, 1940

2,198,326

UNITED STATES PATENT OFFICE 2,198,326

PROGRAM SWITCHING SYSTEM

Albert E. Bachelet, New York, N. Y., assignor to Bell Telephone Laboratories, Incorporated, New York, N. Y., a corporation of New York Application September 22, 1938, Serial No. 231,169

4 Claims. (Cl. 179—1)

This invention relates to telephone transmission systems, and more particularly to systems for transmitting radio broadcast programs over wires from any one of a plurality of interconnected broadcast stations to all the others and is an improvement on the system disclosed and claimed in the United States patent to Bachelet and Brand 2,110,284, issued March 8, 1938.

An object of the invention is to provide a simplified and flexible transmission network, employing one-way amplifiers, for interconnecting a plurality of broadcast stations whereby any station may assume control of the network and condition all the amplifiers in the network to transmit from that station to all the other stations.

In systems of the character herein disclosed, and also as shown in the above-referred to Bachelet et al. patent, the points in the system where two or more lines are joined, i. e., connected together, are called bridging points. At all such bridging points in the system disclosed in the Bachelet et al patent, individual one-way amplifiers are included in each line and so arranged that normally they are connected in a direction to transmit away from the bridging point over the respective lines, but in response to control currents received over any line, the respective amplifier connections are reversed so that that amplifier then transmits toward the bridging point whereas all the other amplifiers at that point still remain in condition to transmit away from the bridging point.

A feature of the present invention resides in the use of a common amplifier at each bridging point and switching means thereat, individual to each line terminating thereat, normally connecting the respective lines in multiple to the output of the amplifier and adapted when operated by control current received over any line to connect that line to the input of the amplifier without disturbing the connection of the other lines to the output.

Other features of the invention will appear from the following specification and appended claims:

Figures 1, 2:
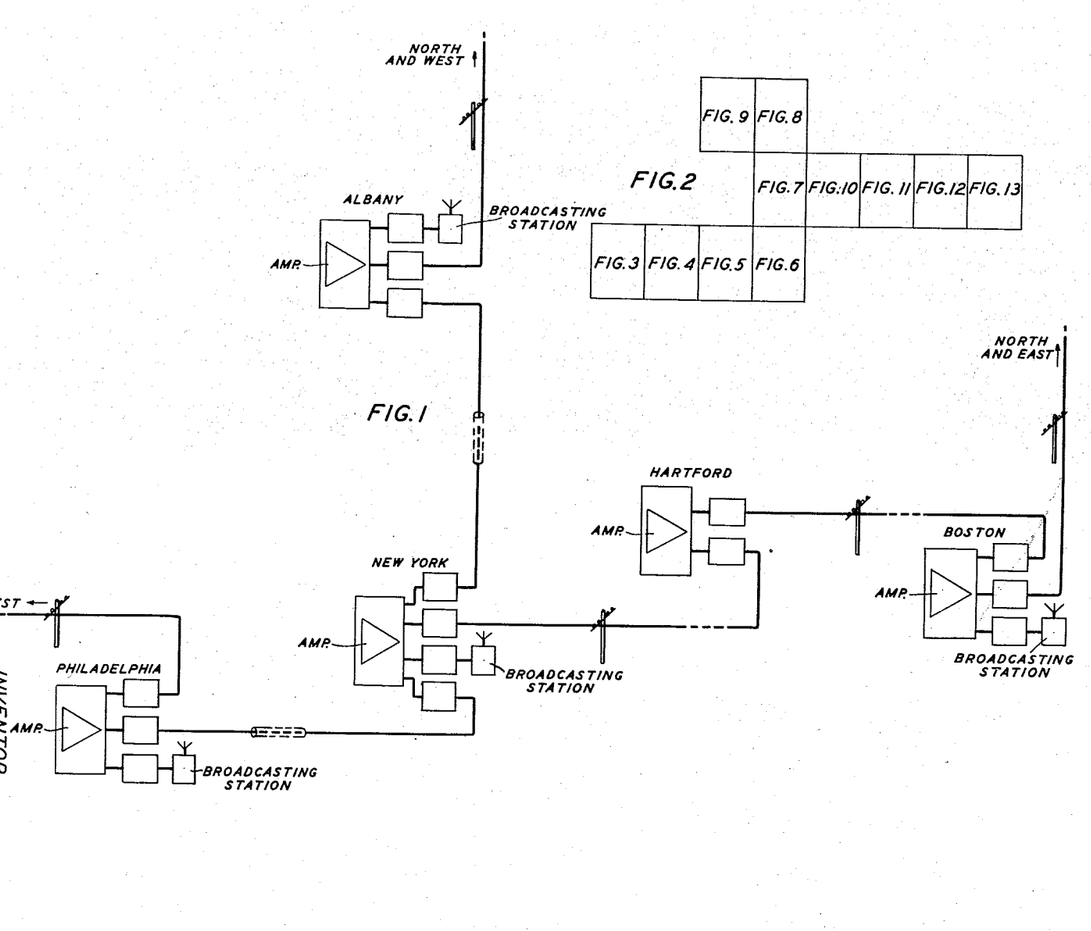
Fig. 1 of which schematically represents a broadcast network with bridging points at Philadelphia, New York, Albany, Hartford and Boston. At Philadelphia a line is shown extending to some bridging point to the south and west. At Albany a line is shown extending to the north and other points west. At Boston a line is shown extending further to the east.
Fig. 2 shows the manner in which the remaining Figs. 3 to 13 of the drawings may be joined to show a more detailed arrangement of the system.
Figure 3:
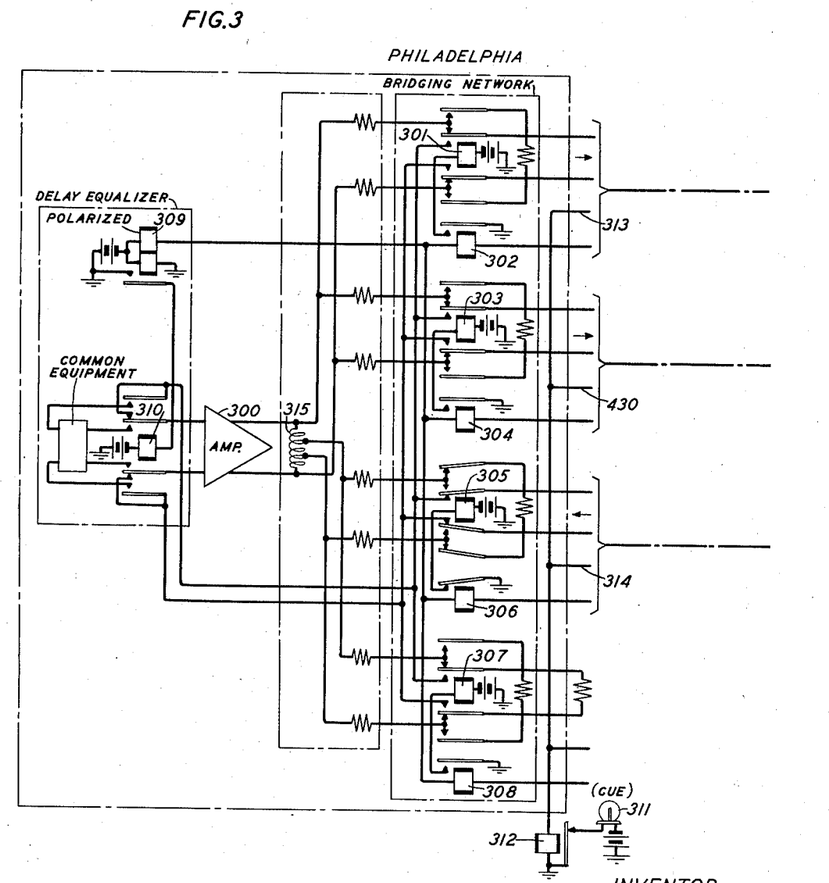
Figure 4:
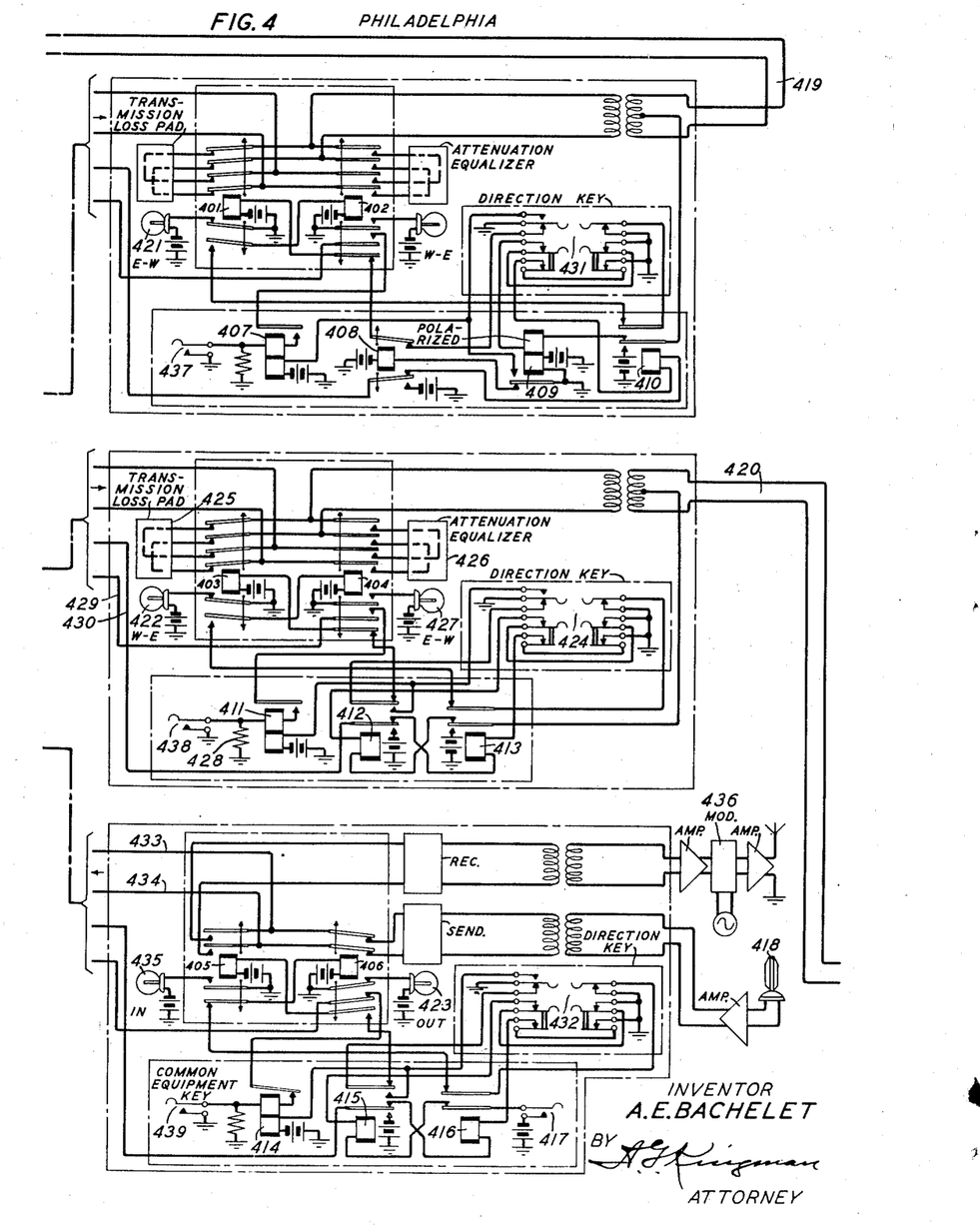
Figure 5:
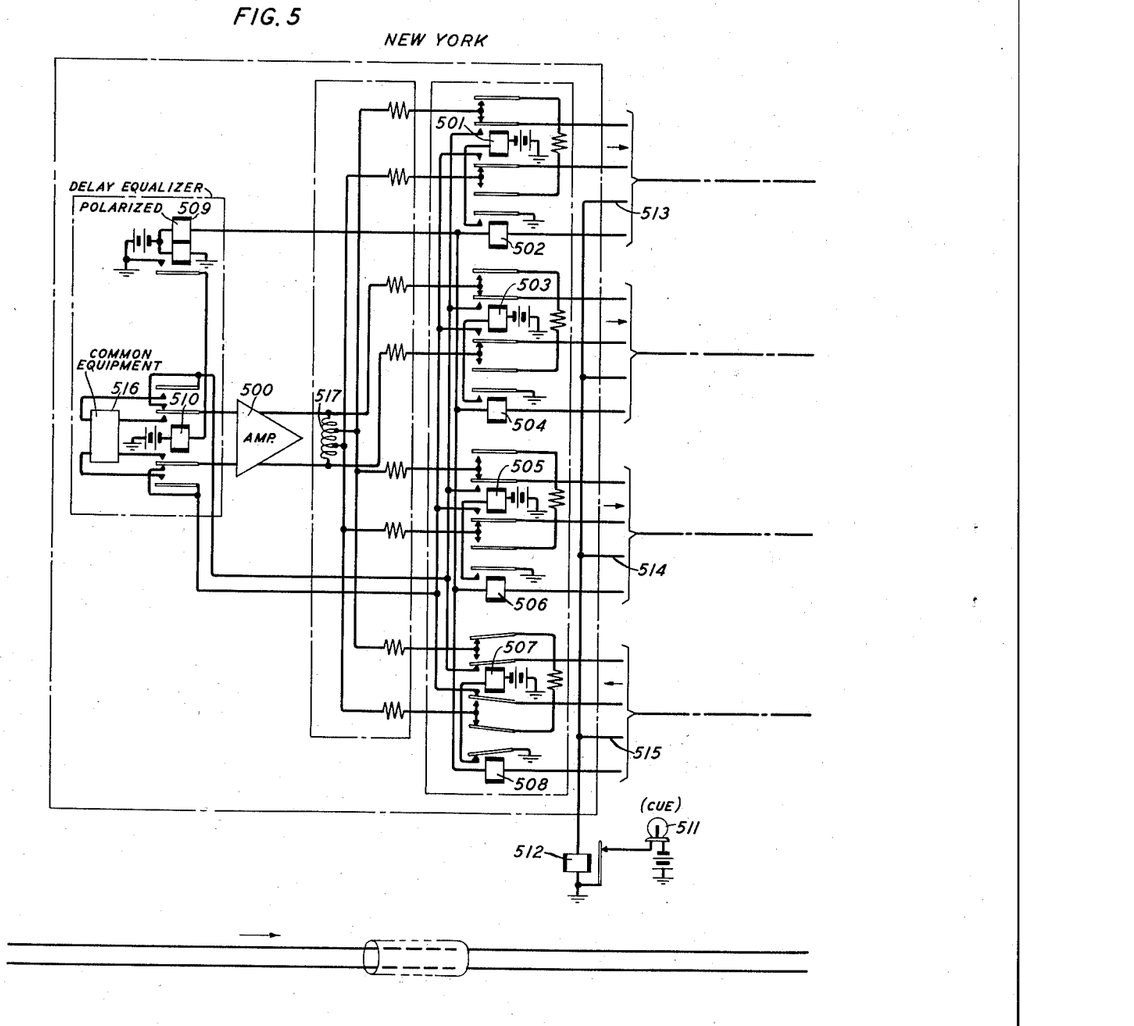
Figure 6:
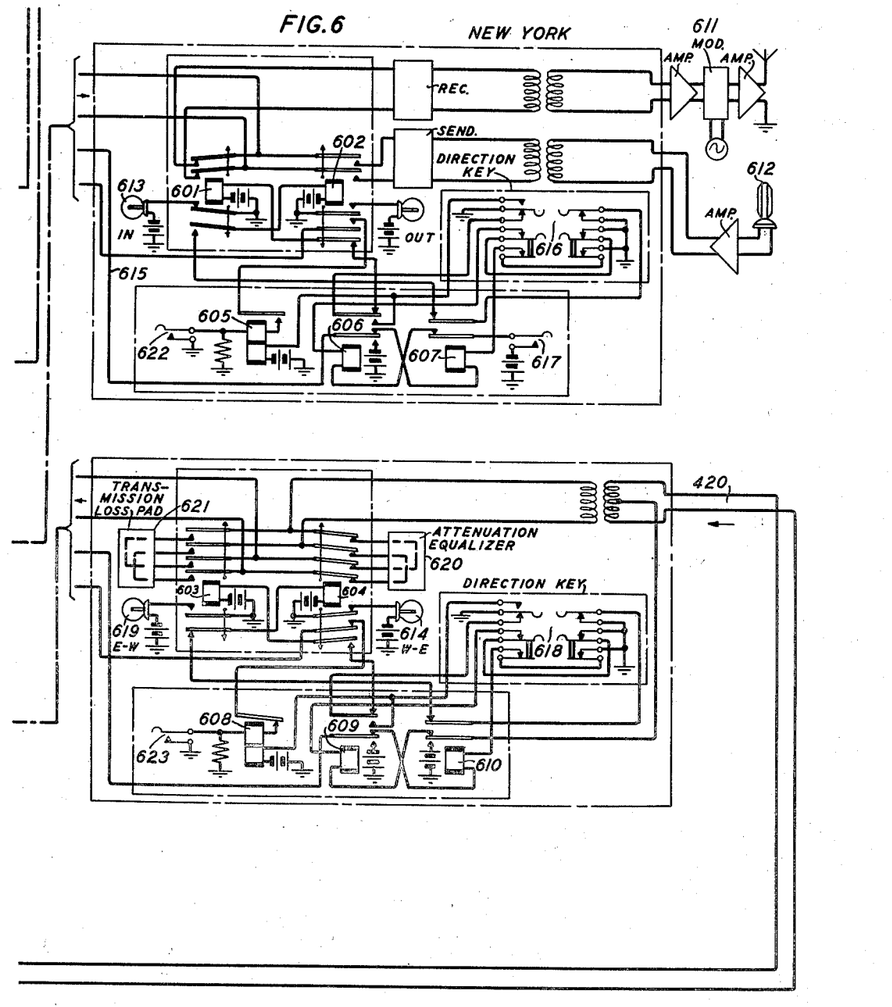
Figure 7:
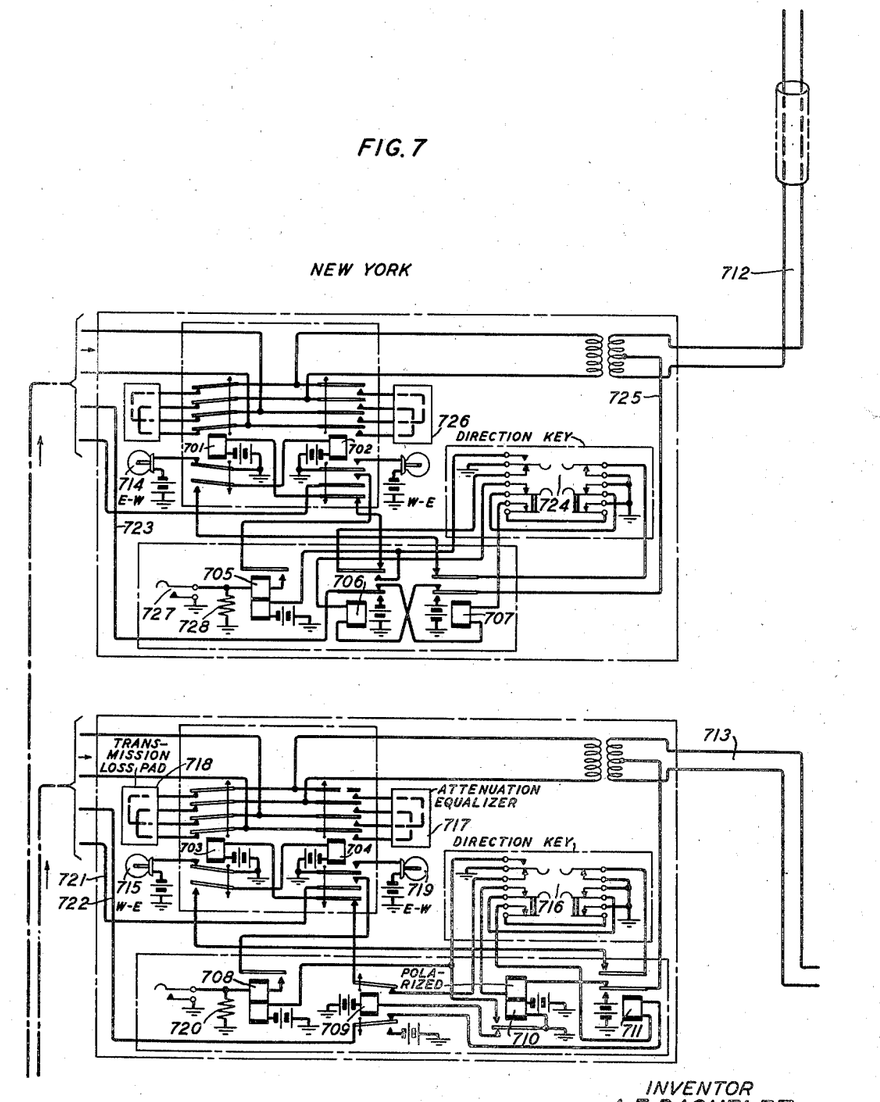
Figure 8:
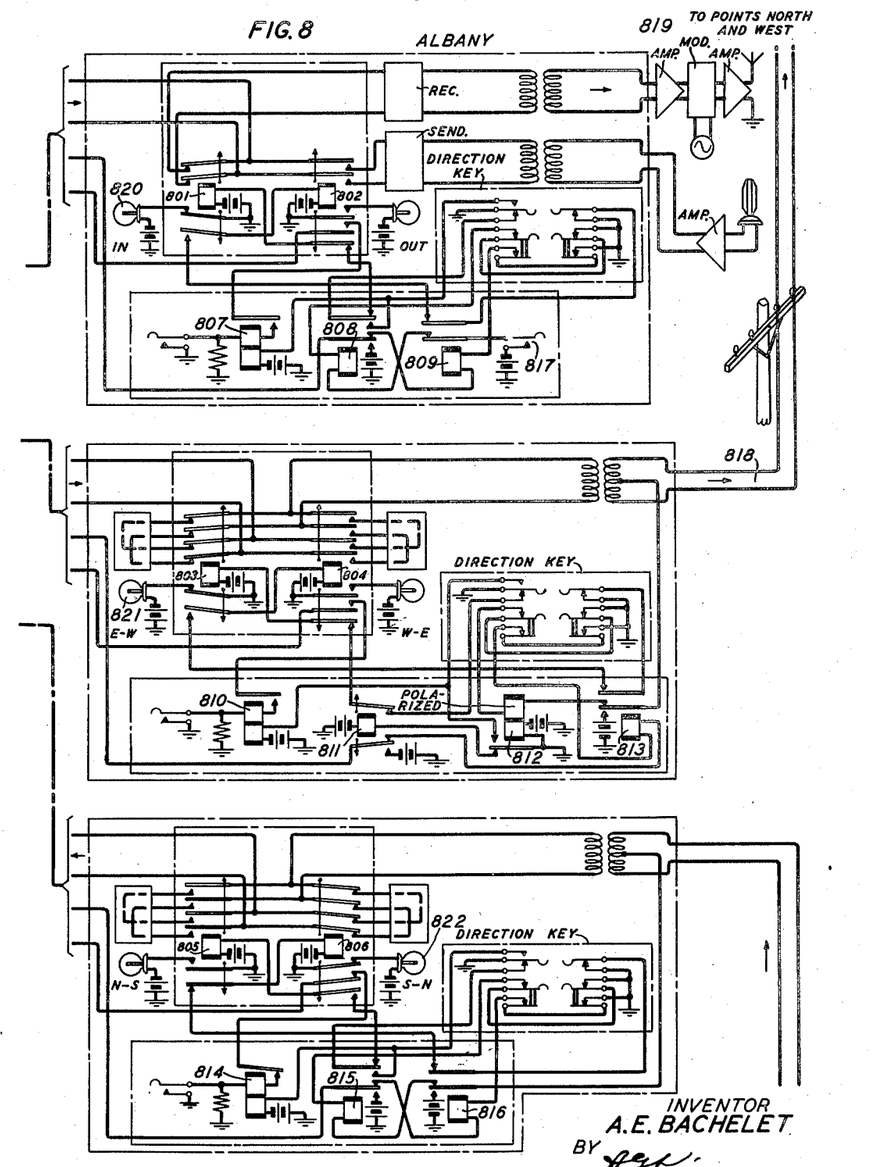
Figure 9:
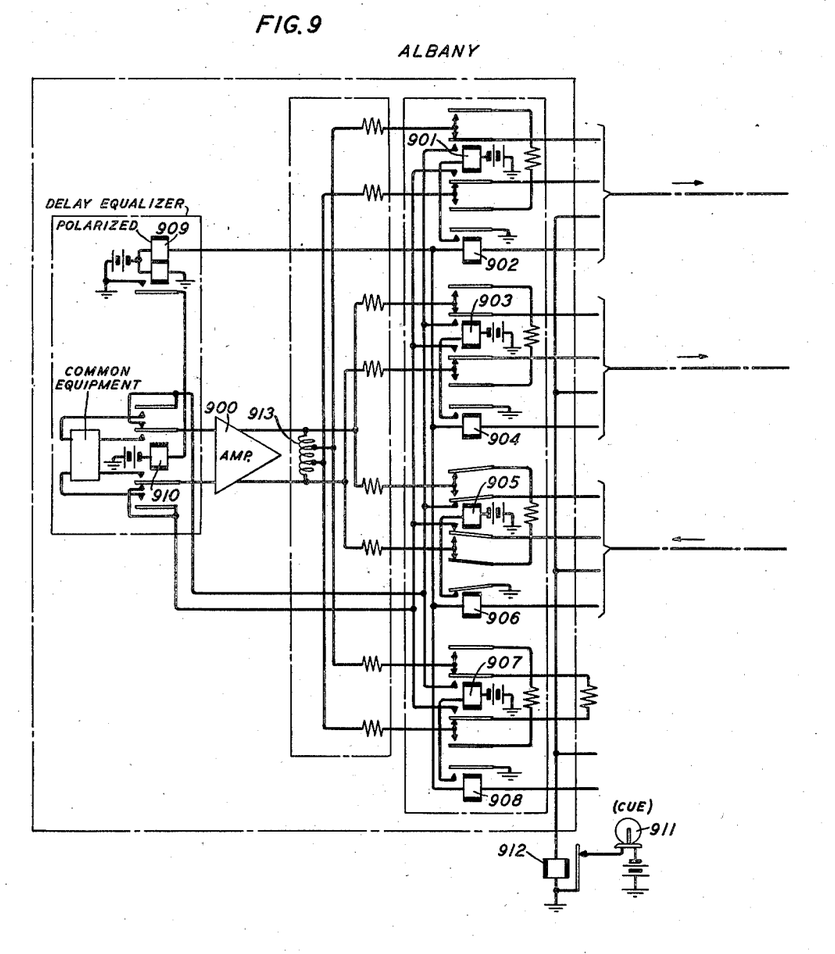

A detailed description of the operation of the system now follows:

By referring to Figs. 3 to 13, when joined as shown in Fig. 2, Figs. 3 and 4 represent a so-called bridging point at Philadelphia, including a local broadcasting station, from which point an open-wire line extends to the south and west and a cable line to New York, represented by Figs. 5, 6 and 7, where another local broadcast station is located. From New York a cable line extends north to Albany, represented by Figs. 8 and 9, and at which point still another local broadcast station is located. From this point an open-wire line also extends to points still further north and west.

Figure 10:
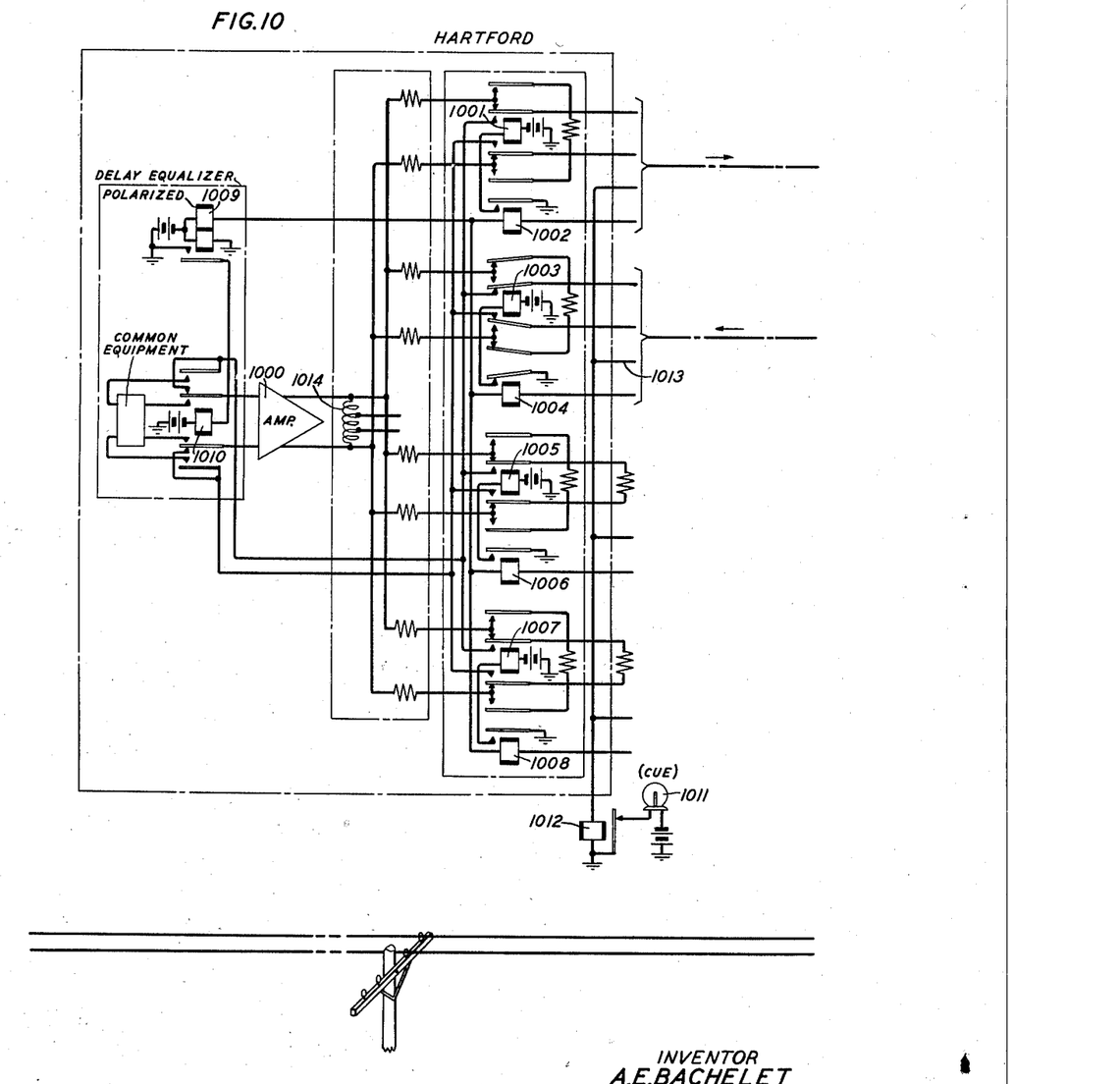
Figure 11:
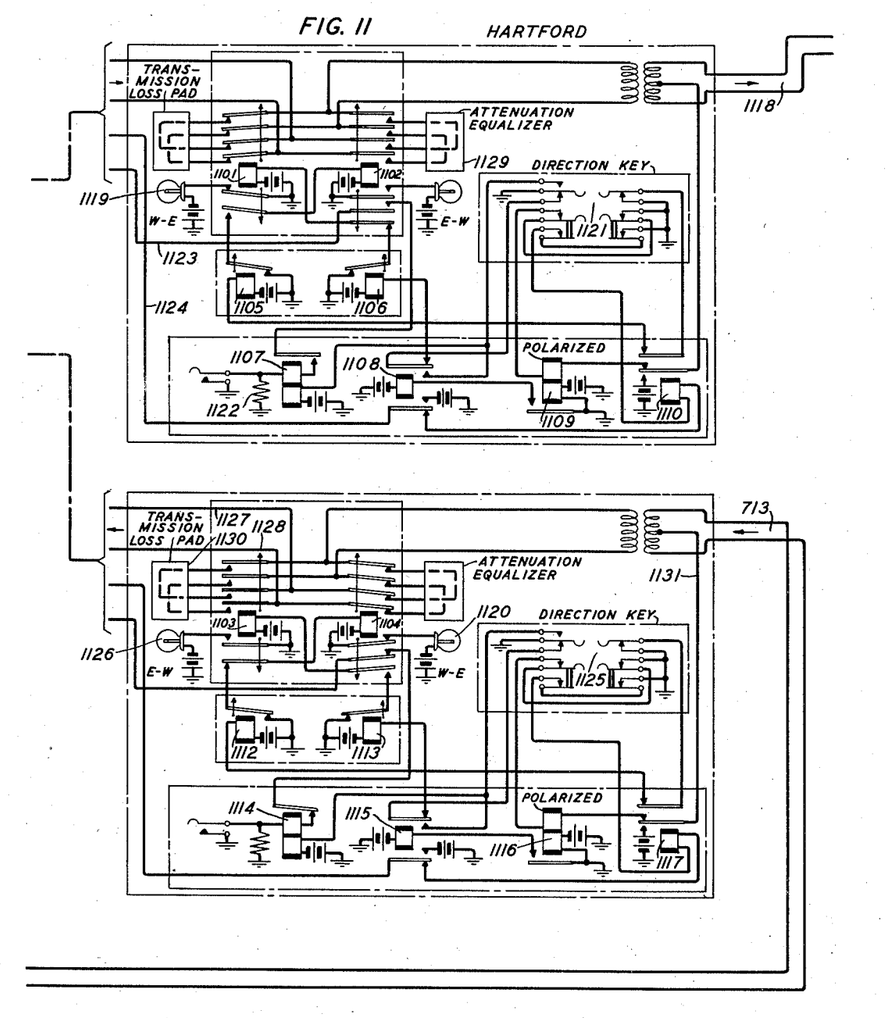
Figure 12:
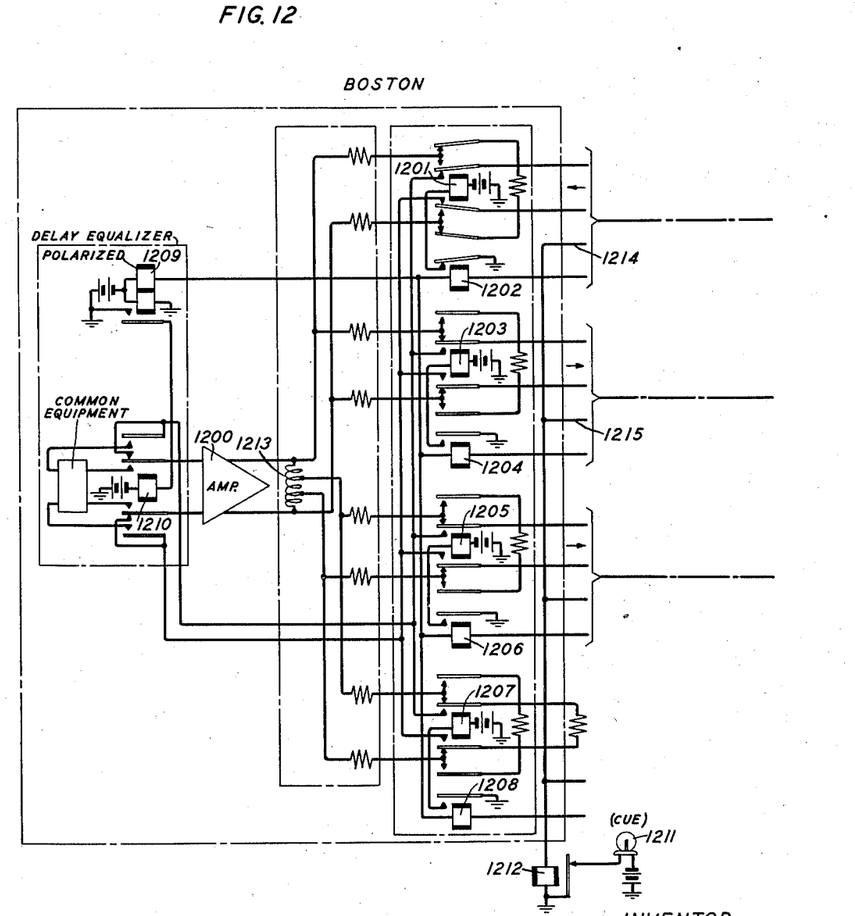
Figure 13:
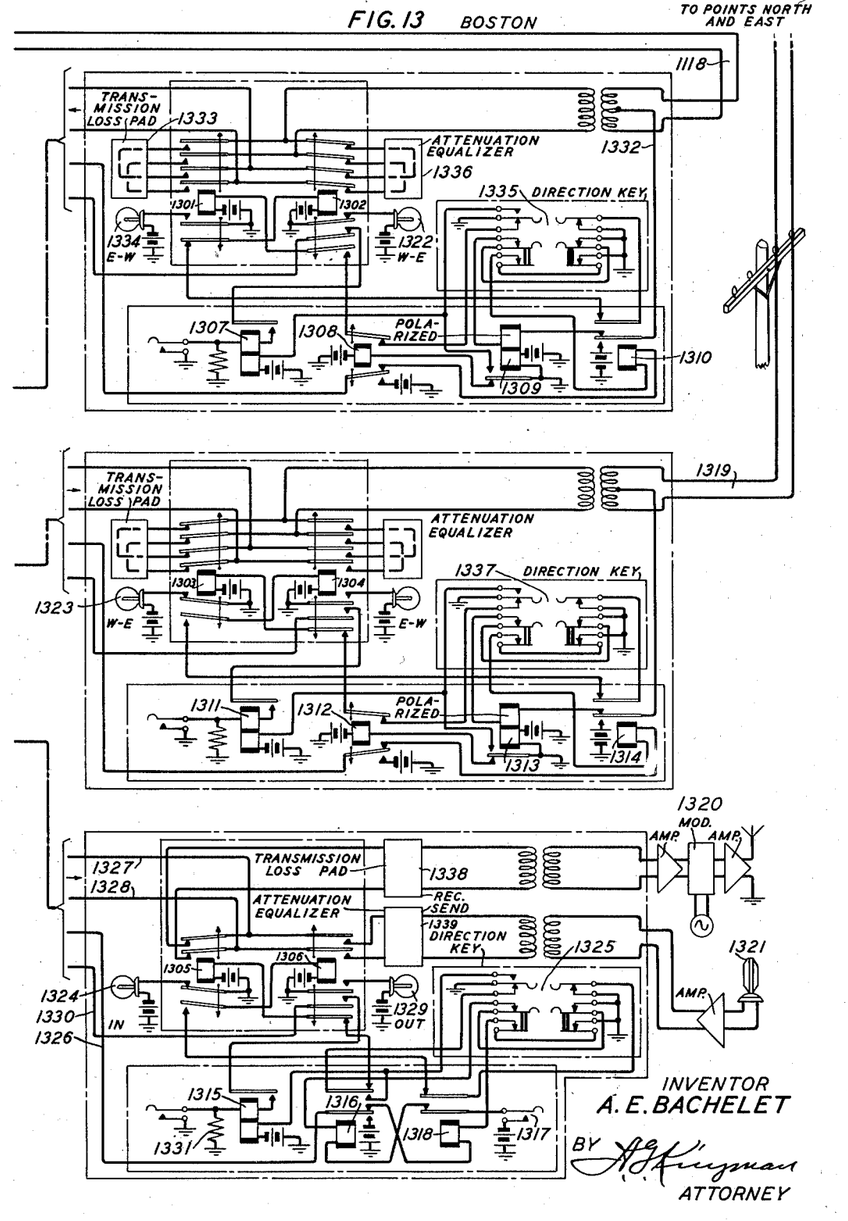

From New York, an open-wire line extends eastward to Hartford, represented by Figs. 10 and 11, and from which point still another open-wire line extends to Boston, represented by Figs. 12 and 13. To serve points still further east of Boston an open-wire line is shown extending eastward from that point.

The amplifiers employed in the present system may be of the high level, high power, feedback type disclosed in the copending application, filed in the name of S. T. Meyers, Serial No. 216,679, filed June 30, 1938, and have an output sufficiently great to supply a bridging network to which may be connected, through an autotransformer, a relatively large number of open-wire lines or cable lines or a combination of both. The autotransformers are indicated by reference characters 315, 517, 913, 1014 and 1213 respectively.

The lines are connected to taps on the autotransformers so chosen as to provide the proper level of transmission for the particular lines. In general, all open-wire lines are connected across substantially the entire winding of the transformer and the cable and studio lines are connected across intermediate taps, as shown.

It will be assumed, for purposes of description, that the broadcast station at Philadelphia, shown at the bottom of Fig. 4 has had control of the network for the purpose of transmitting a program which was accomplished by operating key 417, and that at the conclusion, or near the end, of the program, the key 417 was released.

The operation and subsequent release of key 417 leaves the following relays throughout the system in an operated condition, some of which are normally operated and others operated and locked in an energized condition by the operation of the key referred to, i. e., 305, 306, 401, 403, 406, 408, 414, 507, 508, 601, 604, 608, 701, 703, 709, 801, 803, 806, 811, 814, 905, 906, 1003, 1004, 1101, 1104, 1105, 1106, 1112, 1113, 1114, 1201, 1202, 1302, 1303, 1305, 1307, 1308 and 1312.

A circuit exists at this time from the microphone 418 at Philadelphia over the upper closed contacts of relay 406, inner front contacts of relay 305 and inner back contacts of relay 310 to the input of common amplifier 300. The output of amplifier 300 is connected over inner back contacts of relay 301 and upper closed contacts of relay 401 to the open-wire line leading to the west and south and over inner back contacts of relay 303 and upper closed contacts of relay 403 to the line 420 leading to New York at which point line 420 is connected to the input of common amplifier 500 over upper closed contacts of relay 604, inner front contacts of relay 507, and inner back contacts of relay 510. The output of amplifier 500 is connected over inner back contacts of relay 501 and upper closed contacts of relay 701 to line 712 leading to Albany, over inner back contacts of relay 503 and upper closed contacts of relay 703 to line 713 leading to Hartford and over inner back contacts of relay 505 and upper closed contacts of relay 601 to the radio transmitter 611 at New York.

The line 712 is connected to the input of amplifier 900 at Albany, over upper closed contacts of relay 806, inner front contacts of relay 905 and inner back contacts of relay 910. The output of amplifier 900 is connected to line 818 leading to the north and west over inner back contacts of relay 903 and upper closed contacts of relay 803 and to the radio transmitter 819 of the Albany broadcast station over inner back contacts of relay 901 and upper closed contacts of relay 801.

Line 713 supplied from the output of amplifier 500 at New York is connected to the input of amplifier 1000 at Hartford over upper closed contacts of relay 1104, inner front contacts of relay 1003 and inner back contacts of relay 1010.

At Hartford no broadcast station is shown and for purposes of this description, the bridging circuit including amplifier 1000 is merely an intermediate amplifying point in the line between New York and Boston. Therefore the output of amplifier 1000 is only connected to one line 1118 which extends to Boston, which includes the inner normal contacts of relay 1001 and upper closed contacts of relay 1101.

Line 1118 terminates in the input of amplifier 1200 at Boston after passing over the upper closed contacts of relay 1302, inner front contacts of relay 1201 and inner back contacts of relay 1210. At Boston the output of amplifier 1200 is connected to a line 1319 extending to points east, over inner back contacts of relay 1203 and upper closed contacts of relay 1303 and to the local broadcast station transmitter 1320 over inner back contacts of relay 1205 and upper closed contacts of relay 1305.

It will also be observed that at Philadelphia, direction lamp 421 is lighted indicating that line 419 is connected for transmission from east to west, lamp 422 is lighted indicating that line 420 is connected for transmission from west to east and lamp 423 is lighted indicating that the Philadelphia studio, i. e., microphone 418 is connected for outgoing transmission.

At New York lamps 613, 614, 714 and 715 are lighted. At Albany lamps 820, 821 and 822 are lighted. At Hartford lamps 1119 and 1120 are lighted. At Boston lamps 1322, 1323 and 1324 are lighted, all for the same purpose, i. e., to indicate to the respective attendants in which direction the corresponding lines are connected for transmission.

In addition to the direction lamps 613, 614, etc., above-referred to, "cue" lamps and controlling relays are located at each bridging point as follows: At Philadelphia lamp 311 and controlling relay 312; at New York lamp 511 and relay 512; at Albany lamp 911 and relay 912; at Hartford lamp 1011 and relay 1012; and at Boston lamp 1211 and relay 1212. Under the condition assumed, after key 417 has been released and before a corresponding key at another point has been operated, all five of these lamps will be lighted due to the release condition of their respective controlling relays. The operation of these relays and the consequent extinguishing of their corresponding lamps will be referred to later in connection with the operation of control key 1317 to Boston.

The foregoing is a brief description of the condition of the system at or just before the conclusion of a broadcast originating in the Philadelphia studio which has been arbitrarily assumed as a starting point for the following description of the operation of the switching apparatus.

It will now be assumed that the studio of the Boston broadcasting station represented by the microphone 1321, is to originate the next network program and therefore when the Boston switching attendant, responsible for connecting the Boston station to the network notes the lighted "cue" lamp 1211 and is appraised, usually by a loudspeaker connected to the circuit, that the Philadelphia broadcast is finished, he actuates key 1317 which initiates the operation of relays throughout the network to condition it in such a manner that the program originating in the Boston studio, as represented by microphone 1321, will be transmitted into the network and be received by all the stations for broadcast from their respective transmitters.

When key 1317 is operated it closes a circuit to operate relay 1316 in a circuit from battery over inner normal contacts of relay 1318, winding of relay 1316, and normal contacts of key 1325 to ground. Relay 1316 in operating opens its inner back contacts thereby preventing relay 1318 from operating and at its inner front contacts connects battery to conductor 1326 for a purpose to be later referred to. Relay 1316 in operating also opens its upper back contacts thereby opening the previously closed circuit which held relay 1305 operated which relay thereupon releases and opens its upper and lower closed contacts which extinguishes lamp 1324 and disconnects the transmitter 1320 from the network. Closure of the upper front contacts of relay 1316 operates relay 1315 in an obvious circuit. Release of relay 1305 closes its lower back contacts thereby closing a circuit to operate relay 1306 which can be traced from battery, winding of relay 1306, lower back contacts of relay 1305, upper back contacts of relay 1318 and contacts of key 1325 to ground. Operation of relay 1306 connects the microphone 1321 over its upper front contacts to conductors 1327 and 1328 which are connected to the inner armatures of relay 1205. Operation of relay 1306 closes its lower inner contacts thereby lighting direction lamp 1329 and by closing its lower middle front contacts, it completes a circuit to connect ground to conductor 1330 which can be traced from ground, resistance 1331, upper winding and front contacts of relay 1315, which relay was operated by the operation of relay 1316, and lower middle front contacts of relay 1306 to conductor 1330. Conductor 1326, to which battery was connected by operation of relay 1316, extends to Fig. 12 where it is multiplied to conductors 1214 and 1215. Conductor 1215 can be further traced through Fig. 13 over the lower front contacts of relay 1312 and winding of relay 1314 to grounded contacts of key 1337. Relay 1314 operates and opens its upper back contacts which perform no function at this time. It also opens its inner back contacts and closes its inner front contacts thereby connecting battery to the simplex circuit of line 1319 which extends to the east. The result of connecting this battery to the line 1319 performs no function under the conditions previously assumed for the reason that the next bridging point to the east (not shown) was in condition to receive a program from the west prior to operation of key 1317 and hence as it is to continue to receive a program this time from Boston instead of Philadelphia, no change in the circuit of the next eastern bridging point is necessary.

Conductor 1214 can be traced through Fig. 13 over the lower front contacts of relay 1308 and winding of relay 1310 to ground at contacts of key 1335. Relay 1310 operates and opens its upper back contacts thereby releasing relay 1302 which has previously been energized. Relay 1302 in releasing opens its upper front contacts thereby disconnecting the attenuation equalizer 1336 from the line 1118 to Hartford. The release of relay 1302 opens its inner lower front contacts thereby extinguishing the direction lamp 1322, opens its lower middle front contacts and closes its lowermost back contacts thereby completing a circuit to operate relay 1301 which can be traced over the upper front contacts of relay 1308 to grounded contacts of key 1335.

Relay 1301 in operating inserts the transmission loss pad 1333 in the line 1118 to Hartford, lights the direction lamp 1334 and also interposes a second break in the operating circuit of relay 1302, thus preventing this relay from operating when key 1317 is released. Release of relay 1302 opens its lower middle front contacts, the circuit energizing relays 1307 and 1202, which relays release. The release of relay 1202 releases relay 1201 which disconnects the line 1118 from the input of amplifier 1200 and connects it to the output thereof. Conductor 1330 which was connected to ground through resistance 1331 and the upper winding of relay 1315, when relays 1306 and 1315 operated, extends to Fig. 12 and thence to battery through the windings of relays 1206 and 1209. Relay 1209 is polarized, i. e., its lower winding is continuously energized in a local circuit in a direction tending to hold the relay in its released or non-operate condition and due to the value of resistance 1331, the current flowing in the upper winding of relay 1209 at this time is insufficient to overcome the effect of the current in the lower winding and to operate the relay. Relay 1206, however, is more sensitive and operates in the circuit traced, thereby closing an obvious circuit to operate relay 1205. Relay 1315 is, therefore, held operated in series with relay 1206. Relay 1205 in operating opens its upper and lower inner back contacts thereby disconnecting the output of the amplifier 1200 from conductors 1327 and 1328 and connecting these conductors to the input of the amplifier over the inner normal contacts of relay 1210. It will now be observed that whereas before key 1317 was operated, the input of amplifier 1200 was connected to line 1118 incoming from Hartford through the attenuation equalizer 1336, and the output of amplifier 1200 was connected over conductors 1327 and 1328 and the front contacts of relay 1305, through the transmission loss pad 1338 to the Boston broadcast transmitter 1320. Now these circuit connections are broken down and instead the Boston studio (microphone 1321) is connected through the attenuation equalizer 1339 and over the front contact of relays 1306 and 1205 and back contacts of relay 1210 to the input of the amplifier 1200 and the output of the amplifier is connected to line 1118 to Hartford through the transmission loss pad 1333. It will be further noted that relay 1203 remains in its released condition and therefore the output of amplifier 1200 remains connected over the inner back contacts of relay 1203 and front contacts of relay 1303 to the line 1319 extending eastward from this point, as before.

It will be recalled that when relay 1310 operated, it connected battery to conductor 1332 forming a part of a simplex circuit on line 1118 extending to Hartford, the other end of which simplex circuit passes over the inner back contacts of relay 1110 and the uper winding of relay 1109 to ground at contacts of key 1121. Connection of battery to the Boston end of this simplex circuit by operation of relay 1310 causes relay 1109 at Hartford to operate. Operation of relay 1109 operates relay 1108 which relay opens its upper back contacts thereby relasing relay 1106 which in turn releases relay 1101. The release of relay 1101 extinguishes the direction lamp 1119 and closes an obvious circuit to operate relay 1102. The operation of relay 1102 closes at its lower middle contacts a circuit to hold relay 1107 and to operate relay 1002 which can be traced from ground, resistance 1122, upper winding and front contacts of relay 1107, lower middle front contacts of relay 1102, conductor 1123, winding of relay 1002 and upper winding of relay 1009 to battery. Due to resistance 1122 the flux generated in the upper winding of relay 1009 is insufficient to overcome the bias effect of the lower winding which tends to keep this relay released and consequently it does not operate. Operation of relay 1002 operates relay 1001 which disconnects the line 1118 from the output of amplifier 1000 and connects it to the input thereof over the inner back contacts of relay 1010. Operation of relay 1108 closes its lower front contacts thereby connecting battery to conductor 1124 which extends to Fig. 10 and is multiplied to conductor 1013 which extends back to Fig. 11 where it passes over the lower back contacts of relay 1115, and through relay 1117 to ground at contacts of key 1125 whereupon relay 1117 operates and opens its upper back contacts thereby releasing relay 1112 which in turn opens the previously closed energizing circuit for relay 1104 which releases. Relay 1104 when released closes its lowermost back contacts, and closes a circuit to operate relay 1103. The release of relay 1104 extinguishes direction lamp 1120 and operation of relay 1103 lights the direction lamp 1126. The release of relay 1104 also opens its lower middle contacts thereby releasing relays 1114 and 1004. The release of relay 1004 releases relay 1003 which transfers conductors 1127 and 1128, which terminate the line 713 from New York, from the input of amplifier 1000 to the output circuit thereof. It will now be noted that line 1118 from Boston, over which a program will be transmitted from that point, is now connected through the attenuation equalizer 1129 and upper contacts of relay 1102 to the input of amplifier 1000 over front contacts of relay 1001 and back contacts of relay 1010 and the output of amplifier 1000 is connected over back contacts of relay 1003, upper closed contacts of relay 1103 and through transmission loss pad 1130 to the line 713 extending to New York.

It will further be noted that operation of relay 1117 connected battery over its inner front contacts to conductor 1131 forming the Hartford end of the simplex circuit of the line 713 which terminates at the New York end in ground at contacts of key 716 after passing through the upper winding of polarized relay 710. Relay 710 operates in this circuit thereby releasing relay 709 and operating relay 708. The release of relay 709 opens its upper contacts thereby releasing the previously operated relay 703 which extinguishes the direction lamp 715 and closes its lower back contacts thereby completing a circuit to operate relay 704 which circuit includes the upper back contacts of relay 711 and contacts of the key 716. Relay 703 in releasing opens its upper contacts thereby removing the transmission loss pad 718 from the line circuit and the operation of relay 704 substitutes the attenuation equalizer 717. Operation of relay 704 also lights the direction lamp 719 and by closing its lower middle contacts completes a circuit to hold relay 708 operated and to operate relay 504 which can be traced from ground through resistance 720, upper winding and contacts of relay 708, lower middle contacts of relay 704 and conductor 721 to Fig. 5, where it can be further traced through the winding of relay 504 and the upper winding of relay 509 to battery. Due to the value of resistance 720, the upper winding of relay 509 does not receive sufficient current to overcome the non-operate bias of the lower winding and this relay remains released. Relay 504 operates in this circuit and operates relay 503. Relay 503 in operating transfers the line 713, which now includes upper contacts of relay 704 and attenuation equalizer 717 from the output of amplifier 500 to the input circuit thereof over inner normal contacts of relay 510, thereby conditioning this point to receive, amplify and retransmit to the north and west the program transmitted over the line 713 from the east.

Returning to Fig. 7 when relay 709 released, it closed its lower back contacts thereby connecting battery to conductor 722 which extends to Fig. 5 where it is multipled to corresponding conductors 513, 514 and 515 extending back to the upper portion of Fig. 7 and to Fig. 6.

Battery applied to conductor 722 can be traced over conductor 513 to conductor 723, inner upper back contacts of relay 706 and winding of relay 707 to ground at contacts of key 724. Relay 707 operates and connects battery to the simplex conductor 725 connected to the line 712 extending to Albany. Under the condition assumed, the line 712 was previously transmitting a program in a direction from New York to Albany and as the same condition is to prevail when the program is originated in Boston, the connection of battery to the simplex circuit on line 712 performs no useful function at this time other than to operate relays 815, 813 and 809 and to extinguish the "cue" lamp 911 which will be referred to later. The operation of relay 813 connects battery to the simplex on line 818 extending further to the north and west, the function of which will be obvious from the present description involving Figs. 3 to 13.

The battery applied to conductor 514 by the release of relay 709 extends over conductor 615, inner back contacts of relay 606 and winding of relay 607, to ground at contacts of key 616. Relay 607 performs no function at this time other than to open its contacts thereby preventing accidental operation of key 617 from affecting the switching operation initiated by the operation of key 1317 at Boston.

As the New York transmitter 611 was previously receiving and retransmitting the program originated at Philadelphia and is to continue to receive the program from Boston, no further change is required in this part of the circuit.

Battery applied to conductor 515 by the release of relay 709 passes over the inner back contacts of relay 609 and through the winding of relay 610 to ground at contacts of key 618. Relay 610 operates and opens its upper contacts thereby releasing relay 604 which in turn extinguishes the direction lamp 614 and closes the circuit to operate relay 603. Relay 603 lights the direction lamp 619. The release of relay 604 and the operation of relay 603 removes the attenuation equalizer 620 from the line 420 and substitutes the transmission loss pad 621. The release of relay 604 also opens its lower middle contacts thereby releasing relays 608, 508 and 507. The release of relay 507 reverses the connection between line 420 and the amplifier 500, i. e., it connects the line to the amplifier output instead of to the amplifier input, as was the condition when the program was being transmitted to and through New York from Philadelphia.

It will now be noted that the line 713 between New York and Hartford which previously was connected to the output of amplifier 500 through a transmission loss pad is now connected through an attenuation equalizer to the input of the amplifier and the line 420 between New York and Philadelphia which previously was connected through an attenuation equalizer to the input of amplifier 500 is now connected to the output of the amplifier through a transmission loss pad. Hence it may be said that amplifier 500 at New York has been reversed with respect to lines 420 and 713, but not with respect to the line to Albany or the New York broadcast transmitter. When relay 610 operated, it connected battery to the simplex circuit of line 420 thereby causing operation of relay 412 at Philadelphia in a circuit through relay 412 to ground and contacts of key 424. Operation of relay 412 closes its upper front contacts to energize relay 411 over its lower winding and opens, at its upper back contacts, the energizing circuit of relay 403 which releases, thereby extinguishing the direction lamp 422 and removing the transmission loss pad 425 from the line 420. The release of relay 403 also closes its lower back contacts to energize relay 404 in a circuit to ground at contacts of key 424 over the upper back contacts of relay 413. Relay 404 operated inserts the attention equalizer 426 in the line 420 in place of the transmission pad 425, lights the direction lamp 427 and at its lower middle front contacts closes a circuit to hold relay 411 operated and to energize relay 304, the circuit of which can be traced from ground, resistance 428, upper winding and contacts of relay 411, lower middle front contacts of relay 404, conductor 429, winding of relay 304, and upper winding of relay 309 to battery. Relay 309 is polarized, in the same manner as relays 509, 1009, etc., previously mentioned, and due to the value of resistance 428 does not receive sufficient current to overcome the non-operate bias of the lower winding and cause the relay to operate. Relay 304 operates, however, which in turn operates relay 303 which transfers the line 420 from the output of amplifier 300 to the input thereof. Operation of relay 412 connects battery to a conductor which extends to Fig. 3 and is multipled to conductors 313 and 314. Conductor 313 can be traced back to Fig. 4 and to ground at contacts of 431 over the lower front contacts of relay 408 and winding of relay 410. Relay 410 operates and connects battery to the simplex circuit on line 419 extending to the west and south which will accomplish such functions as may be required at the distant bridging points to control the amplifier connections thereat in order that the proper direction of transmission is maintained. Connection of battery at relay 412 over conductors 430 and 314 passes over the inner back contacts of relay 415 and through relay 416 to ground at contacts of key 432. Relay 416 operates in this circuit and at its inner back contacts opens the circuit for operating relay 415 in order that accidental operation of key 417 at this time will not interfere with the control now being exercised by key 1317 at Boston. Operation of relay 416 also opens its upper back contacts thereby releasing relay 406 which opens its upper contacts thereby disconnecting the Philadelphia studio as represented by the microphone 418 from conductors 433 and 434 extending to Fig. 3. Release of relay 406 also extinguishes the direction lamp 423, closes its lower back contacts thereby completing a circuit to operate relay 405 which can be traced over the upper back contacts of relay 415 to ground at contacts of key 432. Relay 406 in releasing also opens its lower middle front contacts thereby opening the circuit which has previously held relay 414 and relay 306 energized whereupon these relays release. The release of relay 306 releases relay 305 which transfers conductors 433 and 434 from the input of amplifier 300 to the output thereof. Operation of relay 405 lights the direction lamp 435 and closes its upper contacts thereby connecting the Philadelphia broadcasting transmitter 436 to the output of amplifier 300 over the back contacts of relay 305 previously mentioned.

From the foregoing description it will be now seen that whereas prior to operation of key 1317 at Boston the network was interconnected in such a manner that transmission was from the microphone 418 at Philadelphia outward to the west and south and eastward to the next bridging point (New York) at which point an amplifier was interposed in the circuit and connected in such a manner that transmission received over the line from Philadelphia was amplified and retransmitted to a local broadcast station, to Albany in the north, and eastward to Hartford at which point another amplifier was interposed the output of which was connected to a line extending to Boston. At Boston still another amplifier was included in the network having its input terminating the line from Hartford and its output connected to a line extending east from that point and also to a local broadcast station at Boston, under the new condition, i. e., when key 1317 at Boston was operated, the connections of the amplifiers at Boston, Hartford, New York and Philadelphia are such that a program originating at Boston will be transmitted to points east, west to Hartford where it is amplified and retransmitted to New York and at New York where it is reamplified and transmitted north to Albany, to the local New York station, and west to Philadelphia. At Philadelphia the transmission is received, amplified and now supplied to the local broadcast station and also transmitted as before to the west and south.

Located in each bridging point, usually in the control room where the amplifiers and switching equipment are located, are other signal lamps 311, 511, 911, 1011 and 1211 which are called "cue" lamps. These lamps are controlled by individual relays 312, 512, etc., which are energized whenever any one of the control keys such as 417, 617, etc., is operated and thereby extinguishing the respective lamps which are normally lighted in an obvious manner. For example, under the first assumed condition, i. e., when the Philadelphia attendant released the control key 417 at or near the end of the Philadelphia program, relay 415 was released thereby removing battery from the conductor extending to Fig. 3, thereby releasing relay 312 which lighted the "cue" lamp 311. Removal of battery from this same conductor released relay 413 which removed battery from the simplex control circuit over line 420 to New York thereby releasing relay 609 which removed battery from conductor 514 and released relay 512 thereby lighting "cue" lamp 511. Relays 707 and 711 also are released. Relay 707, released, disconnected battery from the simplex control circuit over line 712 which released relay 815 disconnecting battery from the conductors extending to Fig. 9 thereby releasing relay 912 and closing the circuit to light "cue" lamp 911. Relay 711, released, disconnected battery from the simplex control circuit over the line 713 to Hartford whereupon relay 1116 released thereby releasing relay 1115 which in turn disconnected battery from the conductors extending to Fig. 10 to which relay 1012 is multipled. This relay therefore released and lighted "cue" lamp 1011. The release of relay 1115 also caused relay 1010 to release thereby disconnecting battery from the simplex circuit over line 1118 to Boston where it released relay 1309 which operated relay 1308 and disconnected battery from the conductor extending to Fig. 12 where it is multipled to the relay 1212 which thereupon released lighting the "cue" lamp 1211. The lighting of a "cue" lamp at each bridging point is a visual signal to the attendant that the present program is or soon will be concluded and that the attendant at the next point scheduled to transmit a program should be ready to seize control of the network at the proper moment. This may be at some predetermined point on the clock regardless of whether the program being transmitted is completely finished or when the attendant recognizes some audible "cue" heard over a monitoring loud-speaker or other means.

As it has been assumed that Boston is to take control of the network and originate the next program, following the conclusion of the one transmitted from Philadelphia, the Boston control room attendant watches for the "cue" lamp 1211 to light and at the proper time following the lighting of the lamp operates key 1317 which, as previously described, causes a succession of relay operations to reconnect battery at the different points in the network to the multiple conductors to which relays 1212, 1012, 912, 512 and 312 are connected thereby causing these relays to operate and extinguish their respective "cue" lamps as an indication to all attendants that the network has been seized at some point and is locked out of control by all other points until the "cue" lamps are again lighted by the release of the control key which in the present case is key 1317 at Boston.

Associated with each amplifier 300, 500, etc., is a common transmission correcting network which may be included in whichever line is transmitting into the input of the particular amplifier by the operation of its associated switching relay 310, 510, etc. The reason for this common equipment is to avoid duplication in the case where two or more lines terminate at a bridging point, each of which lines require, when they are transmitting into the amplifier, a connecting network of the same characteristic. Instead of permanently associating an individual network with each of these lines, a single network having the proper characteristics is provided and arranged to be automatically switched into the line transmitting into the amplifier, under control of a key such as 437, 438, 439, 622, 623, etc., individual to the line. For example, if line 420 from Philadelphia, and 720 from Albany, both of which terminate at New York, are sufficiently alike in their characteristics so that the respective attenuation equalizers 620 and 726 are substantial equivalents, these networks can be omitted from their respective lines and a single network 516, having the same characteristics, may be connected to the uppermost and lowermost front contacts of relay 510. When this arrangement is used, keys 727 and 623 are permanently operated. Now in case the program is to be transmitted from Albany, control key 817 will be operated by the Albany attendant thereby causing relay 816 to operate and connect battery to the simplex circuit over line 712 which causes relay 706 at New York to operate, which in turn operates relay 705. Operation of relay 706 will release relay 701 which in turn operates relay 702, thereby completing a circuit to hold relay 705 operated and to operate relays 502 and 509 which latter relay operates due to the fact that with key 727 operated, resistance 728 is short-circuited and sufficient current now flows in the upper winding of relay 509 to overcome the non-operate bias on the lower winding. Relay 509 operates relay 510 in an obvious circuit which latter relay closes its front contact thereby connecting the common network 516 between the incoming line and the input of the amplifier which is the equivalent of providing the individual network 726 for line 712 which is connected when relay 702 operates.

If the program is to be transmitted from Philadelphia the operation of key 417 will cause relay 604 to be operated and relay 603 to release and also to cause the operation of relay 608. The operation of relays 604 and 608 completes a circuit to hold relay 608 operated and to operate relay 508. As key 623 is operated, relay 509 also operates which in turn operates relay 510 and connects the network 516 between line 420 and the amplifier input.

As only one line is connected to the amplifier input at the same time, all of the lines terminating at one switching point and having the same characteristics, can be served by one common network thereby obviating the unnecessary expense of providing individual networks for each line.

Relays 401, 402—601, 602—603, 604—701, 702—703, 704—801, 802—803, 804—805, 806—1101, 1102—1103, 1104—1301, 1302—1303, 1304 and 1305, 1306 are for the purpose of conditioning their respective lines with the proper equipment for the direction in which the line is transmitting, i. e., into or away from the respective common amplifier 300, 500, etc. For example, if a program is incoming over line 419 from the south and west, which terminates in Philadelphia in the input of amplifier 300, the line requires the inclusion therein of an attenuation equalizer of certain characteristics which are predetermined and suited to the characteristics of the line, whereas if the line 419 is connected to the output of amplifier 300 and is transmitting from Philadelphia to the south and west a transmission loss pad of the proper characteristics is required, all of which will be understood by those skilled in the art.

As relays 401 and 402, etc., are controlled by current over simplex circuits superimposed on the different lines, which lines are subject to various forms of interfering currents such as lighting, induced currents from nearby power transmission lines, differences in earth potential, etc., false operation of these relays due to line surges is avoided by making them slow-acting, and by other delay circuits introduced, when required, to suit the particular conditions.

At the different bridging points such as Philadelphia (Fig. 4), New York (Fig. 6), etc., where local broadcast lines terminate, the drawings show either the studio microphone or the broadcast transmitter connected to the network, but not both at the same time although it is evident that usually a station originating a program in its studio will also desire to broadcast over its own antenna. In this connection the circuit arrangements shown by the drawing relate only to control of the network circuit and it is assumed that local switching means will be employed to connect the station transmitter to the network in case its studio is originating a program and such a connection is desired.

What is claimed is:

1. In a two-way program transmission system, a bridging station, a plurality of program lines terminating at said bridging station, a program station at the other end of each line, program transmitting and receiving equipment at each program station, switching means at each program station normally connecting said receiving equipment to the line and adapted when operated to disconnect said receiving equipment from the line and substitute said transmitting equipment therefor, a common amplifier having an input circuit and an output circuit at said bridging station, switching means at the bridging station individual to each line normally connecting the respective lines to the output circuit and adapted when operated to disconnect the respective lines from the output circuit and connect them to the input circuit, manually controlled means at each program station for operating the switching means thereat to disconnect the receiving equipment and connect the transmitting equipment and to operate the respective switching means at the bridging station to disconnect the line from the amplifier output and connect it to the input circuit.

2. In a two-way program transmission system, a bridging station, an amplifier at said bridging station having an input circuit and an output circuit, a plurality of program stations, lines for each station normally connected in multiple to the output circuit of said amplifier, relay means individual to each line for disconnecting its respective line from the output circuit and connect it to the input circuit, and manually controlled means at each station for operating the respective relay means.

3. In a two-way program transmission system, a plurality of program stations adapted to receive or transmit a program, a repeater station, a line from each program station to the repeater station, a simplex circuit from each program station to the repeater station comprising the conductors of the respective lines, sources of direct current, manually controlled switching means at each program station for connecting one of said sources to the respective simplex circuit, primary control means associated with each line at the repeater station responding to direct current incoming over the respective simplex circuit to repeat direct current to the primary control means at all other lines, said primary control means being also responsive to direct current relayed thereto to re-relay direct currents to their respective simplex circuits, an amplifier at said repeater station having an input circuit and an output circuit, secondary relay means individual to each line normally connecting its respective line to the output circuit of said amplifier and responsive to operation of its respective primary control means in repeating direct current incoming over the corresponding simplex circuit to transfer the respective line from the output circuit to the input circuit, and a pair of transmission correcting networks of different characteristics associated with each of certain of said lines, relay means associated with said certain lines controlled by the respective primary control means for connecting one or the other of said networks in the line depending upon the direction said direct current is being relayed with respect to the line.

4. In a two-way program transmission system, a plurality of program stations adapted to receive or transmit a program, a repeater station, a line from each program station to the repeater station, a simplex circuit from each program station to the repeater station comprising the conductors of the respective lines, sources of direct current, manually controlled switching means at each program station for connecting one of said sources to the respective simplex circuit, primary control means associated with each line at the repeater station responsive to direct current incoming over the respective simplex circuit to repeat direct current to the primary control means of all other lines, said primary control means being also responsive to direct current relayed thereto to re-relay said direct currents to their respective simplex circuits, an amplifier at said repeater station having an input and an output circuit, secondary relay means individual to each line normally connecting its respective line to the output circuit of said amplifier and responsive to operation of its respective primary control means in repeating direct current incoming over the corresponding simplex circuit to transfer the respective line from the output circuit to the input circuit, a transmission correcting network, means adapted when operated for connecting said network in the input circuit of said amplifier, and manually operated means, individual to said primary control means, for conditioning said network connecting means to operate when the primary control means, at which the manually controlled means is operated, responds to direct current incoming over its associated line simplex circuit.

ALBERT E. BACHELET.